United States Patent [19]
Willey

[11] Patent Number: 5,854,785
[45] Date of Patent: Dec. 29, 1998

[54] SYSTEM METHOD AND WIRELESS COMMUNICATION DEVICE FOR SOFT HANDOFF

[75] Inventor: William Daniel Willey, Arlington Heights, Ill.

[73] Assignee: Motorola, Inc., Schaumburg, Ill.

[21] Appl. No.: 772,665

[22] Filed: Dec. 19, 1996

[51] Int. Cl.⁶ .................................................. H04B 7/216
[52] U.S. Cl. .......................... 370/332; 370/335; 455/442
[58] Field of Search ..................................... 370/331, 332, 370/333, 335, 342; 375/200, 206; 455/436, 442, 458

[56] References Cited

U.S. PATENT DOCUMENTS

| | | | |
|---|---|---|---|
| 5,101,501 | 3/1992 | Gilhousen et al. | 455/442 |
| 5,109,390 | 4/1992 | Gilhousen et al. | 375/200 |
| 5,267,261 | 11/1993 | Blakeney, II et al. | 370/332 |
| 5,490,165 | 2/1996 | Blakeney, II et al. | 375/208 |
| 5,640,414 | 6/1997 | Blakeney, LI et al. | 375/200 |
| 5,754,583 | 5/1998 | Eberhardt et al. | 375/200 |

OTHER PUBLICATIONS

Willey, W. Daniel, "System, Method and Apparatus for Soft Handoff", filed on Oct. 11, 1996, pp. 1–13.
*TIA/EIA Interim Standard: Mobile Station–Base Station Compatibility Standard for Dual–Mode Wideband Spread Spectrum Cellular System*, TIA/EIA/IS–95–A, May 1995, 6–105 to 6–114.

*Primary Examiner*—Alpus H. Hsu
*Assistant Examiner*—Maikhanh Tran
*Attorney, Agent, or Firm*—Donald C. Kordich; Lalita P. Williams

[57] ABSTRACT

A wireless communication device (100) provides for soft handoff in a communication system employing CDMA by providing information on pilot identities to the base station represented by the active pilot in the access probe (215), and possibly in successive access probes. The system infrastructure allocates base stations according to the pilot identities (310) and transmits messages over the Paging Channels of the base station of the active pilot and neighboring base stations represented by the pilot identities (315). Thus, the wireless communication device can simultaneously demodulate the Paging Channel of multiple base stations while in the System Access State of CDMA.

5 Claims, 3 Drawing Sheets

SYSTEM METHOD AND WIRELESS COMMUNICATION DEVICE FOR SOFT HANDOFF

FIELD OF THE INVENTION

The present invention relates generally to the field of digital communications, and more particularly to a system, method, and wireless communication device for soft handoff in a cellular or Personal Communication System (PCS) that employs Code-Division Multiple Access (CDMA). Although the invention is subject to a wide range of applications, it is especially suited for use in cellular radio-telephones and base stations, and will be particularly described in that connection.

BACKGROUND OF THE INVENTION

Interim Standard IS-95-A (IS-95) has been adopted by the Telecommunications Industry Association for implementing CDMA in a cellular system. In the CDMA-equipped system, a mobile station communicates with any one or more of a plurality of base stations dispersed in a geographic region. Each base station continuously transmits a pilot signal having the same spreading code but with a different code phase offset. Phase offset allows the pilot signals to be distinguished from one another, which in turn allows the base stations to be distinguished. Hereinafter, a pilot signal of a base station will be simply referred to as a pilot. The mobile station monitors the pilots and measures the received energy of the pilots.

IS-95 defines a number of states and channels for communication between the mobile station and the base station.

For example, in the Mobile Station Control in the Traffic State, the base station communicates with the mobile station over a Forward Traffic Channel, and the mobile station communicates with the base station over a Reverse Traffic Channel. During a call, the mobile station must constantly monitor and maintain four sets of pilots collectively referred to as the Pilot Set—the Active Set, the Candidate Set, the Neighbor Set, and the Remaining Set. The Active Set are pilots associated with the Forward Traffic Channel assigned to the mobile station. The Candidate Set are pilots that are not currently in the Active Set but have been received by a particular mobile station with sufficient strength to indicate that the associated Forward Traffic Channel could be successfully demodulated. The Neighbor Set are pilots that are not currently in the Active Set or Candidate Set but are likely candidates for handoff. The Remaining Set are all possible pilots in the current system on the current CDMA frequency assignment, excluding the pilots in the Neighbor Set, the Candidate Set, and the Active Set.

The mobile station constantly searches for a Pilot Channel of neighboring base stations for a pilot that is sufficiently stronger than a threshold value. As the mobile station moves from the region covered by one base station to another, the mobile station promotes certain pilots from the Neighbor Set to the Candidate Set, and notifies the base station or base stations of the promotion from the Neighbor Set to the Candidate Set via a Pilot Strength Measurement Message. The base station determines an Active Set according to the Pilot Strength Measurement Message, and notifies the mobile station of the new Active Set via a Handoff Direction Message. When the mobile station commences communication with a new base station in the new Active Set before terminating communications with the old base station, a "soft handoff" has occurred.

In the Mobile Station Idle State, the mobile station monitors a Paging Channel, transmitted from a single base station of the Active Set for control information and pages. Furthermore, the mobile station continues to search the Pilot Channel of neighboring base stations for a pilot that is sufficiently stronger than the pilot of the currently monitored base station. When a pilot is found to be sufficiently stronger, an "idle handoff" to the neighboring base station having the stronger pilot will occur, and the mobile station will then monitor the Paging Channel from this base station.

In a System Access State, the mobile station continues to receive control information over the Paging Channel, and also transmits short signaling messages, such as, call originations, responses to pages, and registrations, over an Access Channel to the monitored base station. While in the System Access State, the mobile station continues its pilot search and updates its Neighbor Set, but, pursuant section 6.6.3.1.3 of IS-95, and in contrast to the Mobile Station Control on the Traffic State and Mobile Station Idle State, the mobile station is not permitted to update its Active Set, and thus can not handoff to another base station.

Whenever the mobile station sends a message in the System Access State, it must make an "access attempt" to the single base station it is monitoring. An access attempt is the process of repeatedly transmitting the message until receiving an acknowledgment for the message from the base station. Each transmission in the access attempt is called an "access probe," which is composed of an Access Channel Preamble and an Access Channel Message. The contents of the an Access Channel Message depends on the type of signaling message. According to section 6.6.3.1.1.1 of IS-95, the same message is sent in each access probe.

IS-95 specifies a particular protocol whenever the mobile station originates a call or responds to a page in the System Access State and sets up for the call in the Mobile Station Control on the Traffic State. Only certain parts of the protocol are discussed herein.

The mobile station first sends an Origination Message over the Access Channel. Upon successful receipt of the Origination Message, the base station sends a Channel Assignment Message over the Paging Channel. The Channel Assignment Message specifies a Traffic Code Channel of the monitored base station for demodulation by the mobile station. The mobile station tunes to the specified Traffic Code Channel, and receives the Forward Traffic Channel. The base station acquires the mobile station on the Reverse Traffic Channel. The mobile station sends, over the Reverse Traffic Channel, the Pilot Strength Measurement Message indicating the current Candidate Set. The base station transmits, over the Forward Traffic Channel, an Extended Handoff Direction Message to the mobile station specifying the Active Set. When the Extended Handoff Direction Message specifies the single, monitored base station and other base stations, a soft handoff is made to the different base stations, and the call is demodulated from the Traffic Code Channels of the base stations represented by the pilots of the Active Set.

Dropped calls and poor call quality reception has been observed using this protocol. This results from the mobile station communicating with only one base station over the Traffic Channel until the soft handoff is made.

To remedy this problem, a proposed modification to IS-95 would more quickly move the mobile station into soft handoff by reporting pilot signal strengths and specifying certain members of the Candidate Set over the Access Channel rather than waiting until a Traffic Channel is acquired. That is, the mobile station would measure pilot signal strengths and add to the initial Access Channel Message the identities of base stations that are suitable for a soft handoff. The base station would include the Active Set in the Channel Assignment Message. Consequently, the mobile station will know its Active Set before acquiring the Traffic Channel, and can immediately acquire the Traffic Channel from multiple base stations rather than one.

This proposed solution has a problem when multiple access probes are required to make a successful access attempt and conditions change between successive access probes. The time between successive access probes is in the order of hundreds of milliseconds. During this time the pilot signal strengths may change. But, because the same message is sent in each access probe, the same pilot strength measurement that is reported by the mobile station in the initial access probe is reported in subsequent access probes. Because the base station receives outdated pilot signal strength measurement information in the subsequent access probes, it may not specify the best base stations suitable for handoff in the Active Set. Consequently poor call quality or dropped calls ensue.

Moreover, delayed or failed call setups have resulted because the mobile station is monitoring the Paging Channel of a single active pilot while in the System Access State. If the reception is poor, then paging channel messages will not be received or will be received inaccurately.

A need therefore exists for a system, method, and apparatus for soft handoff on the Traffic Channel and the Paging Channel during the System Access State.

DESCRIPTION OF THE PREFERRED EMBODIMENTS

Figure 1:
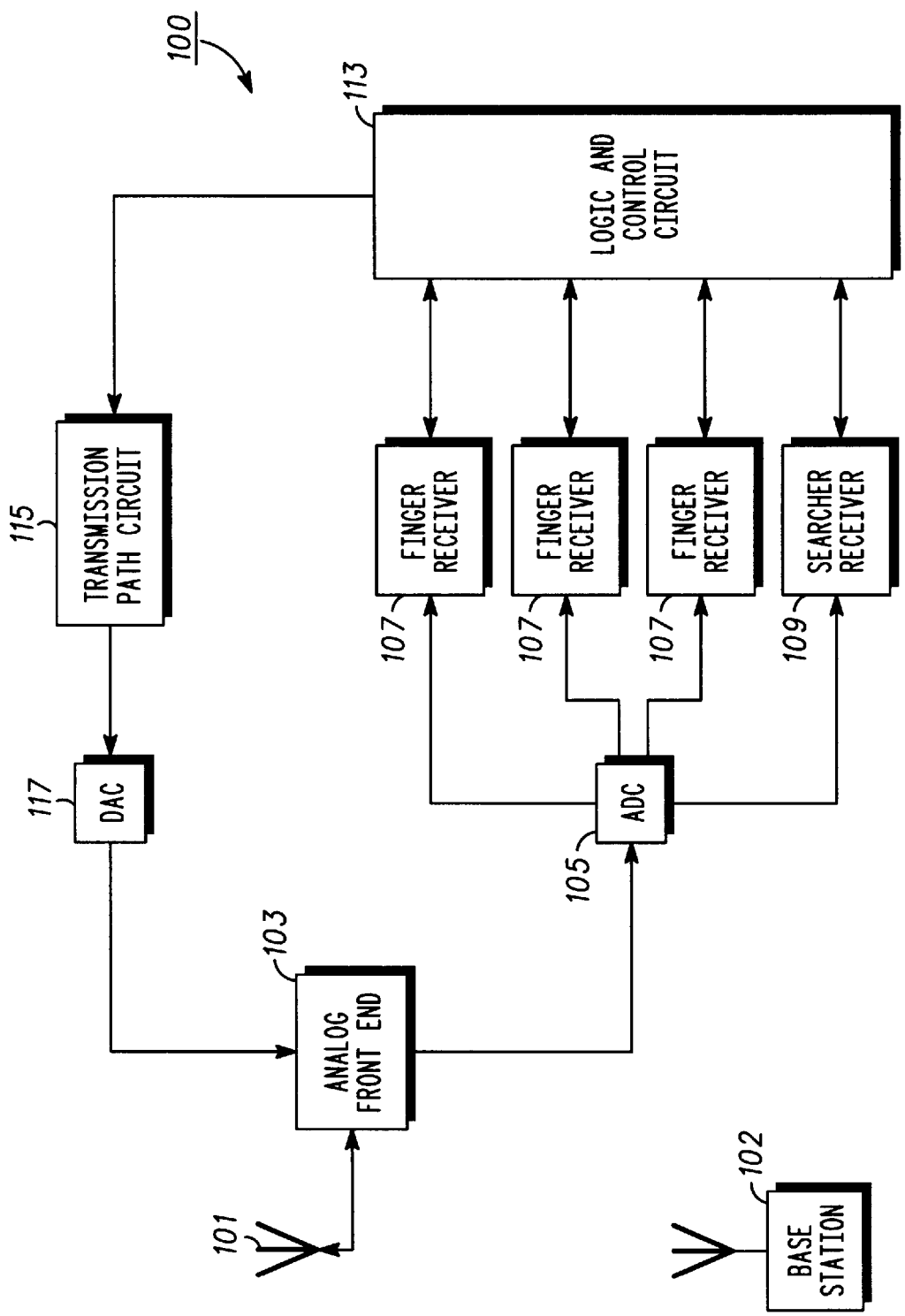
FIG. 1 is an electrical block diagram of a wireless communication system, including a block diagram of a radiotelephone.

The system, method, and apparatus described herein performs soft handoff by providing identities of base stations whose forward traffic channel messages and/or paging channel messages could be successfully demodulated. Further, the measured pilot strengths corresponding to the identities of base stations whose forward traffic channel messages could be successfully demodulated are provided to the system infrastructure.

According to the invention, a wireless communication device measures neighbor pilot strengths while in the System Access State and provides the identities of the base stations corresponding to the measured pilot strengths to the system infrastructure in the initial access probe. The identities indicate at least one neighboring pilot that has sufficient measured pilot strength that an associated Paging Channel could be successfully demodulated. The wireless communication device begins monitoring the Paging Channels of the active pilot and the at least one neighboring pilot. The system infrastructure receives the identities and the system infrastructure allocates the base stations for transmitting the paging channel message according to the identities. Thus, a soft handoff is made and the wireless communication device demodulates the Paging Channel from at least one neighboring pilot as well as the mobile station's current active pilot.

According to another aspect of the invention, the wireless communication device continues to measure pilot signal strengths while in the System Access State and provides the current identities of base stations corresponding to the measured pilot strengths in each access probe. The base station receives the identities and the system allocates the base stations for transmitting the paging channel messages according to the current measured pilot strengths. Thus, another soft handoff is made and the wireless communication device demodulates a paging signal from at least one neighboring pilot as well as the wireless communication device's current active pilot.

In another aspect of the invention, the base station receives the identities of base stations corresponding to the measured pilot strengths to the system infrastructure in the initial access probe and subsequent probes. The identities indicate at least one neighboring pilot that has sufficient measured pilot strength that an associated Forward Traffic Channel could be successfully demodulated. The system infrastructure receives the identities and the system infrastructure allocates the base stations for transmitting the forward traffic channel message according to the identities and measured pilot strengths. Thus, a soft handoff is made and the wireless communication device demodulates the forward traffic channel message from at least one neighboring pilot as well as the mobile station's current active pilot.

The invention provides an advantage over the conventional system, method, and apparatus in that the Paging Channel can be simultaneously demodulated, dropped calls are reduced, and call quality is increased. Additional advantages and novel features of the invention will be set forth in part in the description which follows, wherein embodiments of the invention are shown and described, and in part become apparent to those skilled in the art upon examination of the following detailed description or may be learned by practice of the invention.

Reference will now be made in detail to an embodiment configured according to the present invention.

FIG. 1 is a an electrical block diagram of a wireless communication system, including a block diagram of a wireless communication device, e.g., a radiotelephone 100. This figure illustrates, among other things, an antenna 101 for receiving signals from a plurality of base stations 102 (only one shown) and transmitting signals originated by radiotelephone 100. An analog front end 103 processes the received signals and provides them to an analog-to-digital converter (ADC) 105. The digitized received signals are provided to a rake receiver comprised of a plurality of finger receivers 107 and at least one searcher receiver 109 connected in parallel. The operation of the finger receivers and search receiver is controlled in part by a logic and control circuit 113. The output of the finger receivers and search receiver is provided to the logic and control circuit 113 for further processing.

Logic and control circuit 113 is capable of storing the data and the software program specifying the instructions for executing the method according to the invention, and storing a record of the Active Set, the Neighbor Set, and the Candidate Set. Logic and control circuit 113 provides data to transmission circuit path 115, which processes the data and provides the processed data to a digital to analog circuit (DAC) 117. The analog signal output by DAC 117 is provided to analog front end 103 for transmission to base stations 102 via antenna 101.

Although logic and control circuit 113 is shown as a separate element from the receivers, one of ordinary skill will recognize that portions of the logic and control circuit may reside in the rake receiver or in other elements of the radiotelephone.

Each of the base stations 102 has a similar structure as the radiotelephone 100 for each of the Paging/Access Channel, the Traffic Channel, a Synchronization Channel, and the Pilot Channel (except a reception path is not necessary for the Synchronization Channel and the Pilot Channel), and may also have multiple receive paths and antennas for diversity of reception.

One of ordinary skill in the art will recognize that the communication system requires other infrastructure equipment, which is not shown, for switching, call routing, and other functions.

The method of use and operation of the wireless communication device, as constructed and described above, will now be described with reference to FIG. 2, which is a flow chart illustrating a method 200 of reporting pilot signal strengths.

First the soft handoff on the Traffic Channel will be described.

In the System Access State, searcher receiver 109 initially measures the pilot strength of neighboring pilots. (Step 205.) Logic and control circuit 113 creates an Access Channel Message that includes the identities of the neighboring pilots that have sufficient measured pilot strength that an associated Forward Traffic Channel could be successfully demodulated and the corresponding initially measured pilot strengths. (Step 210.) Analog front end 103 transmits the Access Channel Message with the initially measured pilot strengths and corresponding identities when it performs the first access probe. (Step 215.)

The steps of measuring the pilot signal strengths, (step 220), creating an Access Channel Message that includes the most recent measured pilot strengths and identities, (step 210), and transmitting the Access Channel Message in subsequent access probes are repeated until the radiotelephone receives from the base station an acknowledgment of receipt of the Access Channel Message within a first predetermined time duration, (step 225), or a maximum number of access probes have been transmitted, (step 230).

Reporting the current measured pilot strengths and identities in subsequent access probes is an important feature of the invention, because the system will have current information on the pilot strength measurements for use in allocating and determining the base stations for soft handoff.

Figure 2:
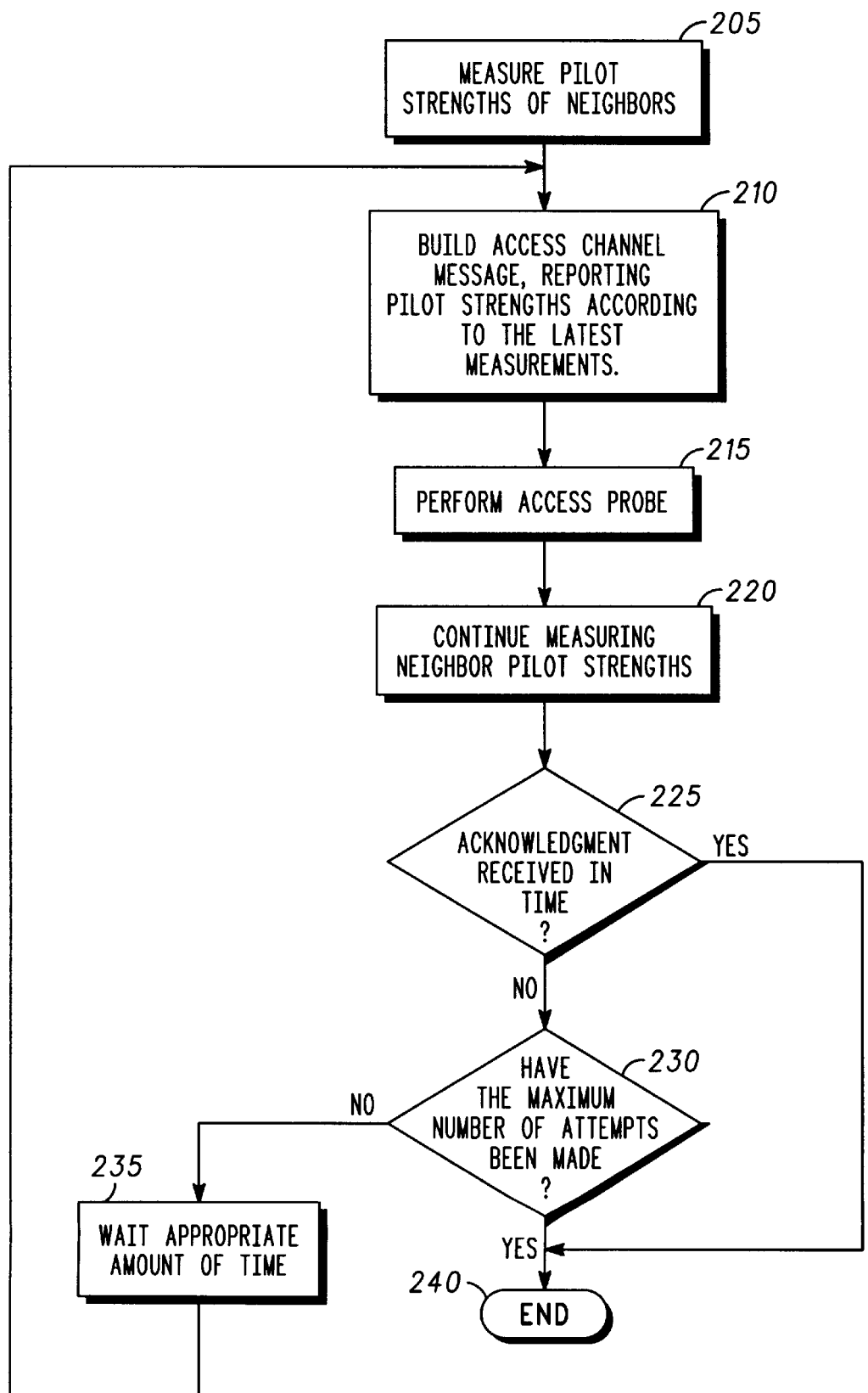
FIG. 2 is a flow chart illustrating a method of reporting pilot signal strengths employed by the radiotelephone shown in FIG. 1.

Referring to FIG. 2, logic and control circuit 113 determines if the acknowledgment of receipt of the Access Channel is received within a first predetermined time duration. (Step 225.) The acknowledgment of receipt of the Access Channel can be the receipt of the Channel Assignment Message. When the acknowledgment is received, the method terminates. (Step 240.) When it has not, logic and control circuit 113 determines if a predetermined maximum number of transmissions of the Access Channel Message have been executed. (Step 230.) If so, the method terminates. (Step 240.) If not, logic and control circuit 113 waits a second predetermined time duration, (step 235), before creating the next Access Channel Message that includes the recently measured neighbor pilot strengths and corresponding identities. (Step 210.)

The measured neighbor pilot strengths included in the Access Channel Message indicate neighboring pilots that have sufficient measured pilot strength that an associated Paging Channel could be successfully demodulated. Or, the measured neighbor pilot strengths can indicate both the neighboring pilots that have sufficient measured pilot strength that an associated Forward Traffic Channel could be successfully demodulated and the neighboring pilots that have sufficient measured pilot strength that an associated Paging Channel could be successfully demodulated as the same measured neighbor pilots.

Now the soft handoff on the Paging Channel will be described.

If the wireless communication device employs the feature of handoff on the Paging Channel and simultaneous demodulation of the Paging Channels, the identities of the neighboring pilots that have sufficient measured pilot strength indicating that the Paging Channel of the corresponding neighboring pilot could be successfully demodulated are successively transmitted in the Access Channel Message to the infrastructure over the Access Channel of the base stations represented by the active pilot. The infrastructure uses these reported identities and measured pilot strengths to allocate the base station for soft handoff and to transmit the paging channel messages over the Paging Channels of the base stations corresponding to the active pilot and the reported neighboring pilots. After performing each access probe, in step 220, logic and control circuit 113 assigns a plurality of finger receivers 107 to the active pilot and the reported neighboring pilots, and the assigned receiver fingers 107 simultaneously demodulate the Paging Channels of the respective base stations.

Alternatively, the feature of reporting the most current identities may not be employed. Thus, the neighboring pilots that have sufficient measured pilot strength that an associated Paging Channel could be successfully demodulated are reported in the initial Access Channel Message, but in subsequent access probes the same identities are reported.

Reporting to the infrastructure the current neighboring pilots for simultaneous demodulation is an important feature of the invention because it improves the likelihood that the wireless communication device will receive and successfully demodulate the Channel Assignment Message or other messages.

The method of use and operation of the infrastructure, as constructed and described above, will now be described with reference to FIG. 3, which is a flow chart illustrating a method 300 of specifying base stations suitable for handoff.

First the soft handoff on the Traffic Channel will be described.

Figure 3:
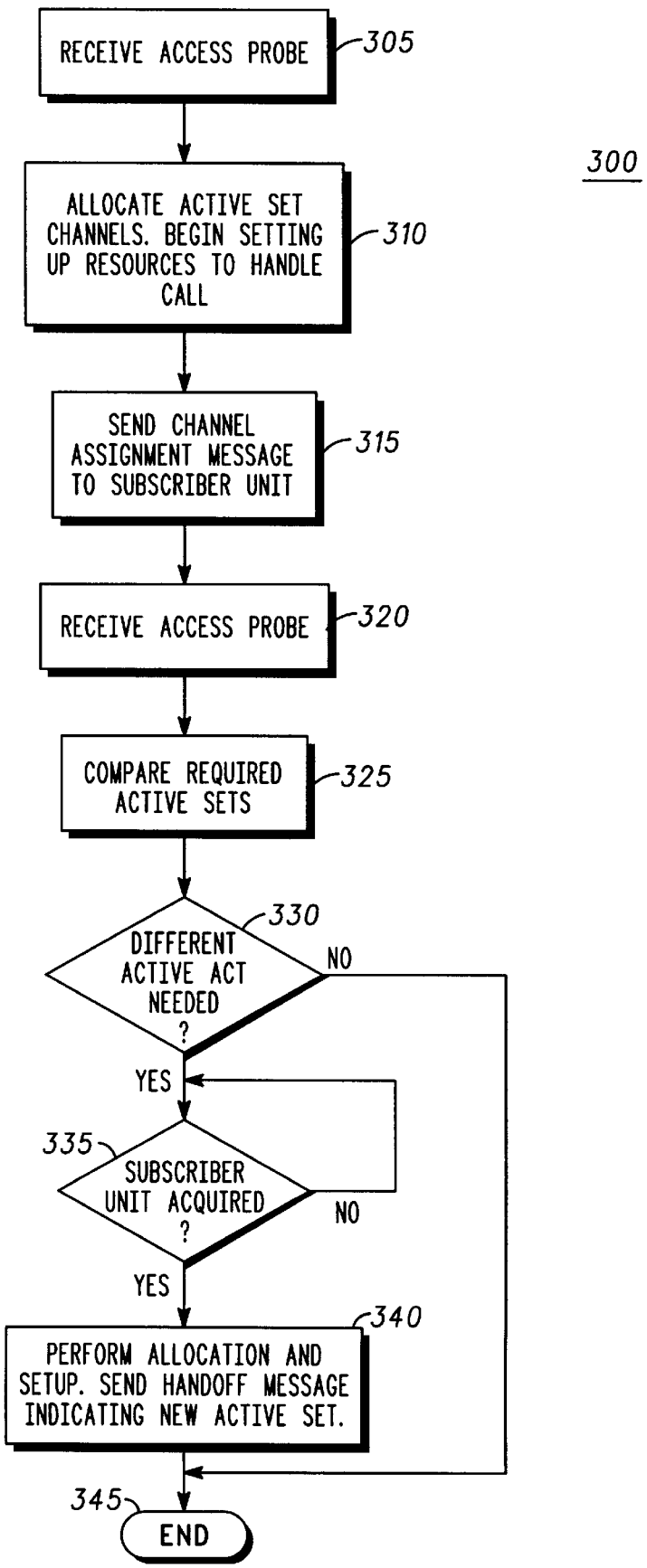
FIG. 3 is a flow chart illustrating a method of specifying base stations suitable for handoff.

Referring now to FIG. 3 and to the structure of the infrastructure and the base station, the analog front end eventually successfully receives a first one of the access probes and thus the Access Channel Message, (step 305), which will be referred to as the first Access Channel Message. The infrastructure begins to allocate the Active Set of pilots representing base stations that will transmit over their Forward Traffic Channel, by creating a first Active Set according to the first set of measured pilot strengths and corresponding identities, and begins setting up resources to handle the call. (Step 310.)

After base station 102 receives the Access Channel Message, it or the allocated base stations if the feature of Paging Channel handoff and simultaneous demodulation is employed, sends the acknowledgment of receipt of the Access Channel Message, which may be the Channel Assignment Message. The Channel Assignment Message specifies the first Active Set representing the pilots the wireless communication device should tune to for receiving their Forward Traffic Channel. (Step 315.)

In some situations, e.g., when there are forward link errors on the Paging Channel, radiotelephone 100 may transmit another access probe before it receives the acknowledgment of receipt of the Access Channel Message. Accordingly, base station 102 will receive another Access Channel Message, (step 320), referred to as the second Access Channel Message, which specifies more current pilot strength measurements and corresponding identities than those in the first Access Channel Message. The infrastructure determines if it needs to specify a new Active Set for Traffic Channel handoff that is different from the first Active Set based on the more current measurements.

For example, the infrastructure creates a second Active Set for Forward Channel Traffic reception according to the second set of measured pilot strengths and corresponding identities, compares the first Active Set for Forward Channel Traffic reception and the second Active Set for Forward Channel Traffic reception, (step 325), and determines if the first Active Set and the second Active Set are different, (step 330). The first Active Set and the second Active Set are different, e.g., when they specify one or possibly more different pilots in their respective sets of pilots.

When a different Active Set is not necessary, the method ends. (Step 345.) When a different Active Set is necessary, the base station waits until the subscriber unit is acquired on the Reverse Traffic Channel. (Step 335.) The infrastructure allocates the Active Set channels, by creating a second Active Set according to the second set of measured pilot strengths and identities, and begins setting up resources to handle the call. (Step 340.) Although shown after step 335, the allocation may commence as soon it is determined that the Active Sets are different.

Furthermore, base station 102 sends, over the Forward Traffic Channel, an Extended Handoff Message specifying the second Active Set. (Step 340.) The wireless communication device can then perform a soft handoff to the pilots of the second Active Set.

Now the soft handoff on the Paging Channel will be described.

The analog front end eventually successfully receives a first one of the access probes and thus the Access Channel Message, (step 305), which will be referred to as the first Access Channel Message. The infrastructure begins to allocate the base stations identified in each message that will transmit over their respective Paging Channel, and begins setting up resources to handle transmission of the paging channel message. (Step 310.) The allocated base stations send a paging channel message, such as the Channel Assignment Message, over their respective Paging Channel. (Step 315.) Upon receipt of subsequent Access Channel Messages, the same allocation and transmissions will occur.

Although the handoff for Traffic Channel and for Paging Channel have been described separately, the initial and successive Access Channel Messages can include separately both the measured pilot strengths and corresponding identities of neighboring pilots that have sufficient measured pilot strength that an associated Forward Traffic Channel could be successfully demodulated and the identities of neighboring pilots that have sufficient measured pilot strength that an associated Paging Channel could be successfully demodulated. Furthermore, only one set of measured pilot strengths and corresponding identities can be included that represent the neighboring pilots that have sufficient measured pilot strength that an associated Forward Traffic Channel and Paging Channel could be successfully demodulated.

In summary, an embodiment configured in accordance with the present invention provides for soft handoff in a wireless communication system employing CDMA by providing information on pilot signal strengths and corresponding identities of base stations to the base station represented by the active pilot in the access probe, and possibly in successive access probes. The system infrastructure allocates base stations according to the identities and pilot signal strengths and transmits the paging signal over the Paging Channel of the base station of the active pilot and neighboring base stations represented by the measured signal strengths. Thus, the wireless communication device can simultaneously demodulate the Paging Channel of multiple base stations while in the System Access State of CDMA.

Moreover, the base station receives the pilot strength measurements and corresponding identities of base stations, and the system infrastructure specifies the base stations for the wireless communication device to handoff to in order to demodulate the Traffic Channel.

What is claimed is:

1. A method of handing off a wireless communication device in the System Access State of a Code-Division Multiple Access communication system, the method comprising the steps of:
    a) determining at least one neighboring pilot whose Paging Channel could be successfully demodulated;
    b) creating an Access Channel Message that includes an identity of the at least one neighboring pilot;
    c) transmitting the Access Channel Message;
    d) assigning a first finger receiver to an active pilot and a second finger receiver to the at least one neighboring pilot whose identity was included in the Access Channel Message; and
    e) simultaneously demodulating the Paging Channel of the active pilot and the at least one neighboring pilot while the wireless communication device is in the System Access State.

2. The method of claim 1 further comprises the step of repeating steps a) through c) until an acknowledgment of receipt of the Access Channel Message is received.

3. The method of claim 2 further comprises the steps of:
    determining, after each execution of step c), if the acknowledgment of receipt of the Access Channel is received within a first predetermined time duration;
    determining if a predetermined maximum number of transmissions of the Access Channel Message have been executed when the acknowledgment of receipt of the Access Channel Message is not received within the first predetermined time duration; and
    waiting a second predetermined time duration before executing step b) when the predetermined maximum number of transmissions of the Access Channel Message have not been executed.

4. In a Code-Division Multiple Access communication system having a plurality of base stations, each base station transmitting a pilot, a wireless communication device for handing off the wireless communication device while in a System Access State, the wireless communication device storing an active pilot and a plurality of neighboring pilots, the wireless communication device comprising:
    a searcher receiver for determining at least one neighboring pilot of the plurality of neighboring pilots whose Paging Channel could be successfully demodulated;
    a logic and control circuit for creating an Access Channel Message that includes an identity of the at least one neighboring pilot;
    an analog front end for transmitting the Access Channel Message; and a plurality of finger receivers;

the logic and control circuit assigns a first finger receiver of the plurality of finger receivers to the active pilot and a second finger receiver of the plurality of finger receivers to the at least one neighboring pilot whose identity was included in the Access Channel Message;

the first finger receiver and second finger receiver simultaneously demodulate the Paging Channel of the active pilot and the at least one neighboring pilot, respectively, while the wireless communication device is in the System Access State.

5. A Code-Division Multiple Access communication system comprising:

an active base station for transmitting an active pilot;

a plurality of neighbor base stations, each neighbor base station transmits a neighboring pilot;

a wireless communication device for monitoring the active pilot, for measuring the neighboring pilot strengths, and for providing, in an initial access probe while in a System Access State, the identities of the neighbor base stations corresponding to the measured neighboring pilot strengths, wherein the identities indicate at least one neighboring pilot that has sufficient measured neighboring pilot strength that an associated Paging Channel could be successfully demodulated, and the wireless communication device simultaneously monitors the active pilot and the at least one neighboring pilot; and a system infrastructure for receiving the identities and for allocating the neighbor base stations according to the identities, wherein each allocated neighbor base station transmits a paging channel message;

wherein the wireless communication device demodulates the paging channel message from the at least one neighboring pilot as well as the active pilot.

* * * * *